Patented Nov. 24, 1931

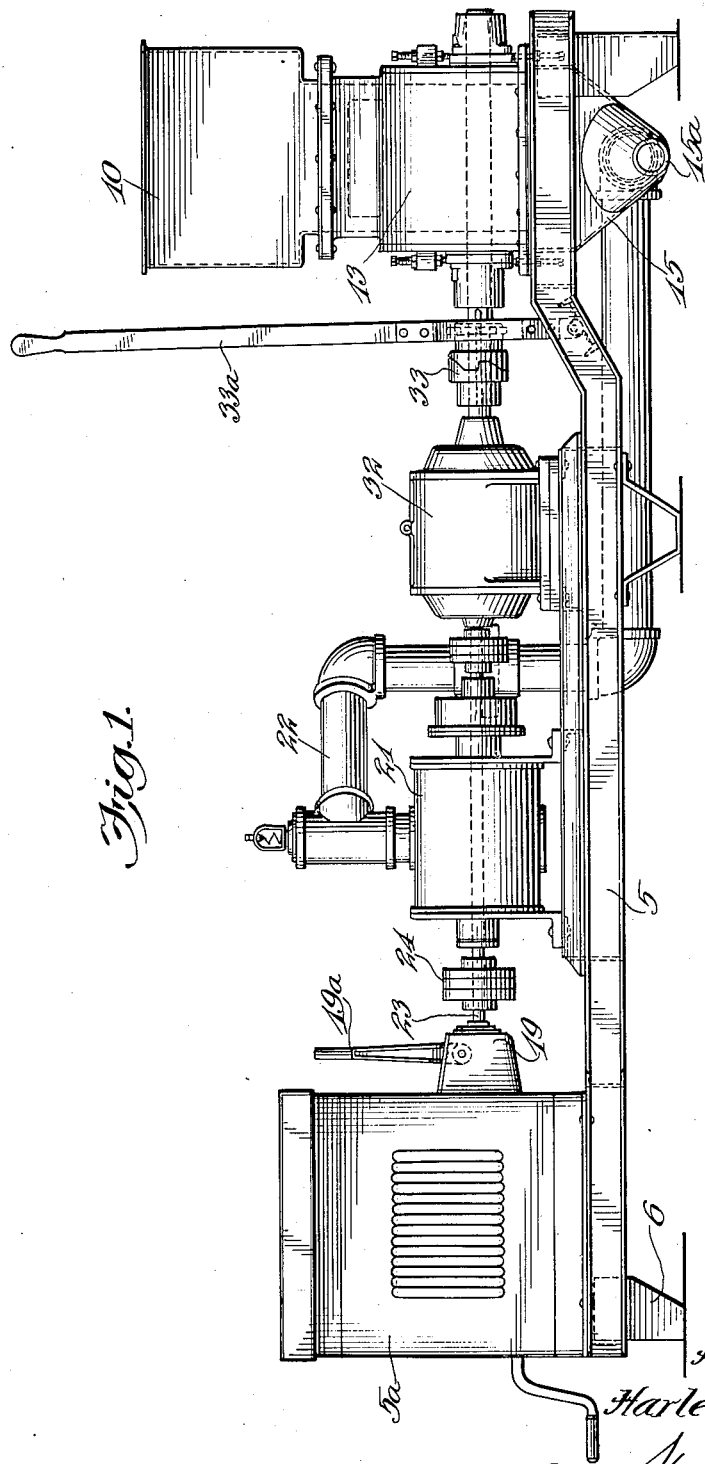

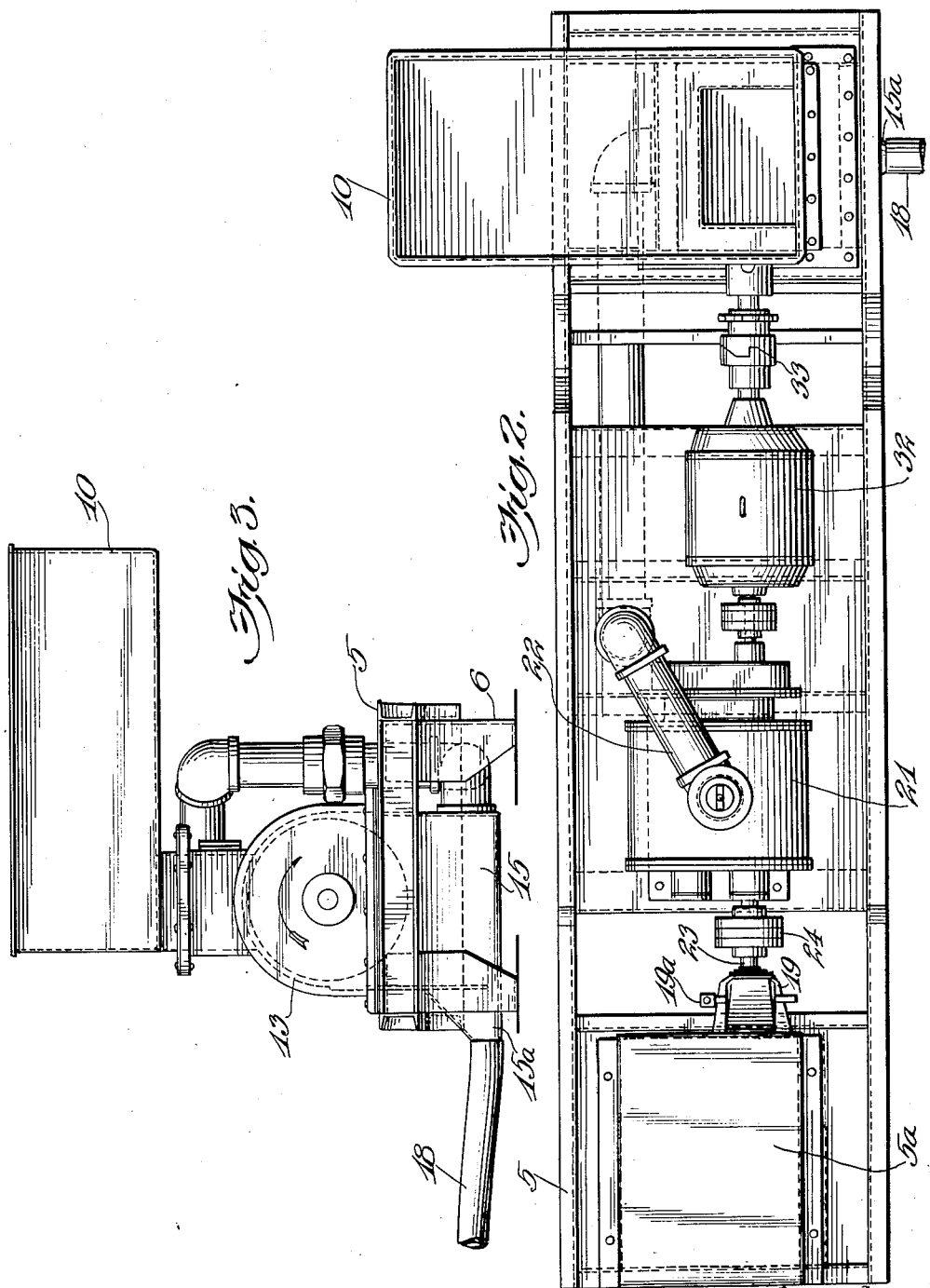

1,833,627

UNITED STATES PATENT OFFICE

HARRY H. WEISS AND HARLEY R. EMERSON, OF CHICAGO, ILLINOIS

MATERIAL TRANSFER APPARATUS

Application filed February 3, 1931. Serial No. 513,180.

Our invention relates to apparatus for feeding loose material to distant points, and more particularly to places to be filled by the material, our present apparatus being a direct improvement over the one patented by Harry H. Weiss on December 2, 1930, under No. 1,783,487.

Since our improvement is designed more particularly for material having a freely flowing nature, our main object is to reduce the apparatus whereby to eliminate the forward feed and picker units previously employed.

A further object of the improvement is to arrange the units of the apparatus in a direct course and to operate on a single axis of rotation.

A still further object of the improvement is to arrange the units and parts accessory thereto in the most compact form consistent with proper design and accessibility, the apparatus becoming by such an arrangement far more portable.

Another object of the improvement is to design the same so favorably for a direct power drive that this fact and the compactness of the apparatus make it of more advantage to include a small power plant with the apparatus than to provide connections for securing the drive from the vehicle on which the apparatus is carried.

A final but nevertheless important object of the invention is to design the novel apparatus on lines of neatness and simplicity.

With the above objects in view and any others that may suggest themselves from the specification and claim to follow, a better understanding of the invention may be had by reference to the accompanying drawings, in which—

Fig. 1 is an elevation of the improved apparatus;

Fig. 2 is a plan view thereof; and

Fig. 3 is an end view taken from the right-hand side of Fig. 1.

Referring specifically to the drawings, 5 denotes a base frame on which the units of the apparatus are mounted, this frame having feet 6 to support it on a vehicle chassis.

As in the previous case, we provide the hopper 10, but fit the same directly over the rotary feeder 13, since the material is of a nature to flow into the feeder without any special means of propulsion. The numeral 15 now denotes the bottom of the feeder housing, where the material measured by the feeder falls.

The power plant for the apparatus is situated at the opposite end of the frame 5, and comprises a gasoline motor in a suitable housing 5a. The motor has a suitable clutch 19 and control lever 19a, its shaft 23 having a flexible joint 24 interposed before it enters a blower 21 of the type previously employed. The axial drive from the motor through the blower is continued into a speed reducer 32 of the type previously employed, and then passed through a clutch 33 into the feeder 13, the clutch being controlled by a lever 33a. The blower throws air under pressure by way of a conduit 22 which takes a downward course to enter the feeder bottom 15 at one side. From the other side of the feeder bottom extends a nipple 15a to which is attached a hose 18, the latter being led to any point of discharge such as the space between the walls of a building, to fill the same with insulating material.

As the material treated by the apparatus is of a freely flowing nature, we have not only eliminated the horizontal screw feed previously employed but also the picker below the feeder, since the material is practically free from packing or tangling tendencies. Thus, the air pressure delivered by the conduit can operate directly on the material falling into the bottom 15 whereby to propel the same into the hose 18. Also, the consistency of the material and the absence of any interfering parts in the bottom 15 enable us to clean the latter and the hose periodically by simply forcing air through the same while the feeder is not in operation, this being made possible by releasing the clutch 33. Further, the direct axial drive from the motor through the blower, speed reducer and feeder eliminate the changes and extra shafting previously employed, saving power, space and material. Also, this drive secures good balance, compactness of design and freedom from vibration. The apparatus is now a close-coupled, compact and self-contained machine, whose size is so reduced from all directions that it lends itself much more readily than before for portable use, such as on vehicles of smaller sizes or for mounting on skids to be transported for use in one place or another. The compact design of the apparatus also makes the inclusion of the power plant highly advisable, eliminating the necessity of adapting the apparatus to various drive conditions found in one case or another. Finally, the apparatus in its present form exemplifies neatness from the standpoint of machine design and assembly, as well as simplicity.

We claim:—

A remote delivery apparatus for loose material, comprising a hopper, a succession of operative units comprising a power plant, a blower, a speed reducer and a rotary feeder, the latter connecting directly with the bottom of the hopper, a container into which the feeder discharges, a communicative connection between the blower and the container, discharge means for the container, and a clutch between the speed reducer and the feeder.

In testimony whereof we affix our signatures.

HARRY H. WEISS.
HARLEY R. EMERSON.